United States Patent
Zheng

(10) Patent No.: US 11,733,171 B2
(45) Date of Patent: Aug. 22, 2023

(54) LIGHT ATTENUATION DEVICE FOR HIGH POWER UV INSPECTION TOOL

(71) Applicant: KLA Corporation, Milpitas, CA (US)

(72) Inventor: Yu Zheng, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 16/147,558

(22) Filed: Sep. 28, 2018

(65) Prior Publication Data

US 2020/0080943 A1     Mar. 12, 2020

Related U.S. Application Data

(60) Provisional application No. 62/729,827, filed on Sep. 11, 2018.

(51) Int. Cl.
    *G02B 5/20*          (2006.01)
    *G02B 26/02*       (2006.01)
    (Continued)

(52) U.S. Cl.
    CPC ........... *G01N 21/8806* (2013.01); *G02B 5/20* (2013.01); *G02B 7/006* (2013.01); *G02B 7/008* (2013.01); *G02B 26/023* (2013.01)

(58) Field of Classification Search
    CPC .............. G03F 7/7015; G03F 7/70191; G03F 7/70883; G03F 7/70891; G03F 7/70958;
    (Continued)

(56) References Cited

U.S. PATENT DOCUMENTS 2,243,047 A * 5/1941 Foster .................... G03B 27/80
                                                             355/83
3,671,124 A * 6/1972 Amolsch et al. ...... G03B 27/04
                                                            355/124
(Continued)

FOREIGN PATENT DOCUMENTS

CN        108332855 A     7/2018
JP        H03225312 A   10/1991
(Continued)

OTHER PUBLICATIONS

ROC (Taiwan) Intellectual Property Office, Office Action for TW Application No. 108132672, dated Feb. 6, 2023.
(Continued)

*Primary Examiner* — Christina A Riddle
(74) *Attorney, Agent, or Firm* — Huse IP Law; Charles C. Huse

(57) ABSTRACT

A light attenuating device includes a housing, a first filter, a first motor configured to move the first filter, and a pneumatic actuator configured to move the first filter to either be in contact with the housing or to not be in contact with the housing. The filter includes multiple slit openings that vary in width such that the amount of light that passes through the multiple slit openings varies as the first filter is moved. The light attenuating device may also include a second filter and a second motor configured to move the second filter. A method of light attenuation is also disclosed that includes adjusting the position of a filter such that a portion of the filter is irradiated by a radiating beam, and while maintaining the irradiation of the portion of the filter, moving the filter to be in contact with a thermally conductive object.

23 Claims, 12 Drawing Sheets

LIGHT ATTENUATING SYSTEM WITH FILTER COOLING
BY WAY OF THERMAL COUPLING TO HOUSING
(CLAMPED)

(51) Int. Cl.
  *G02B 7/00* (2021.01)
  *G01N 21/88* (2006.01)
(58) Field of Classification Search
  CPC ............ G03F 7/70825; G03F 7/70833; G01N 21/8806; G01N 2201/068; G01N 2201/0686; G01N 2223/30; G01N 2223/31; G01N 2223/3103; G01N 2223/3106; G01N 2223/313; G01N 2021/3162; G01N 2021/3166; G01N 2021/3174; G01N 2021/3177; G01N 2021/6471; G02B 5/201; G02B 5/208; G02B 5/22; G02B 5/26; G02B 5/28; G02B 5/283; G02B 5/285–289; G02B 5/20–5/289; G02B 26/023; G02B 7/006; G02B 7/008
  USPC ............ 356/237.1–237.6, 238.1–238.3, 356/239.1–239.8, 240.1, 241.1–241.6, 10, 356/409, 414, 416, 418, 419; 355/30, 355/67–71; 359/308, 350–361, 491.01, 359/577, 586, 588, 722–723, 885–892; 353/52–56, 88
  See application file for complete search history.

(56) References Cited

U.S. PATENT DOCUMENTS

| | | | | |
|---|---|---|---|---|
| 4,176,926 A | * | 12/1979 | Eadie | G06K 15/225 |
| | | | | 396/548 |
| 5,091,743 A | * | 2/1992 | Nagata | G03B 27/32 |
| | | | | 355/27 |
| 5,535,250 A | * | 7/1996 | Seher | G03F 7/2039 |
| | | | | 378/157 |
| 5,642,456 A | * | 6/1997 | Baker | G02B 6/266 |
| | | | | 385/140 |
| 5,751,429 A | * | 5/1998 | Wada | G01J 3/02 |
| | | | | 348/266 |
| 5,774,222 A | * | 6/1998 | Maeda | G01N 21/8806 |
| | | | | 356/394 |
| 6,241,366 B1 | * | 6/2001 | Roman | G02B 26/007 |
| | | | | 362/322 |
| 6,862,340 B2 | * | 3/2005 | Wurzer | G21K 1/10 |
| | | | | 250/505.1 |
| 6,874,249 B2 | | 4/2005 | Holmes | |
| 2001/0017741 A1 | * | 8/2001 | Tamaru | G02B 5/3083 |
| | | | | 359/885 |
| 2002/0176183 A1 | * | 11/2002 | Erz | G02B 1/11 |
| | | | | 359/885 |
| 2003/0025890 A1 | * | 2/2003 | Nishinaga | G03B 27/42 |
| | | | | 355/53 |
| 2006/0043318 A1 | * | 3/2006 | Kodera | G02F 1/1339 |
| | | | | 250/504 R |
| 2006/0291077 A1 | * | 12/2006 | Shim | G02B 7/00 |
| | | | | 359/819 |
| 2007/0170379 A1 | * | 7/2007 | Watson | G02B 5/22 |
| | | | | 250/515.1 |
| 2008/0043313 A1 | * | 2/2008 | Ambar | G02B 27/46 |
| | | | | 359/234 |
| 2014/0204558 A1 | | 7/2014 | Bartlett | |

FOREIGN PATENT DOCUMENTS

KR  20020036934 A  5/2002
KR  100618377 B1  8/2006

OTHER PUBLICATIONS

PCT/US2019/050270, International Search Report, dated Dec. 24, 2019.
PCT/US2019/050270, Written Opinion of the International Searching Authority, dated Dec. 24, 2019.

* cited by examiner

LIGHT ATTENUATION SYSTEM WITH A SINGLE FILTER

LIGHT ATTENUATION SYSTEM WITH MULTIPLE FILTERS

LIGHT ATTENUATION SYSTEM WITH MULTIPLE FILTERS

FILTER WITH MULTIPLE RADIAL VARIANT SLITS
(2-D VIEW)

FILTER WITH MULTIPLE RADIAL VARIANT SLITS
(3-D VIEW)

FILTER ATTENUATION

FILTER WITH MULTIPLE VARIANT RADIUS HOLES
(2-D VIEW)

LIGHT ATTENUATING SYSTEM WITH FILTER COOLING
BY WAY OF THERMAL COUPLING TO HOUSING
(UNCLAMPED)

LIGHT ATTENUATING SYSTEM WITH FILTER COOLING
BY WAY OF THERMAL COUPLING TO HOUSING
(CLAMPED)

LIGHT ATTENUATION SYSTEM WITH TWO FILTERS
CONTROL FLOWCHART

LIGHT ATTENUATION DEVICE FOR HIGH POWER UV INSPECTION TOOL

CROSS REFERENCE TO RELATED APPLICATIONS

This application claims priority under 35 U.S.C. § 119 from U.S. Provisional Application No. 62/729,827, entitled "LIGHT ATTENUATION DEVICE FOR HIGH POWER UV INSPECTION TOOL," filed on Sep. 11, 2018, the subject matter of which is incorporated herein by reference.

TECHNICAL FIELD

The described embodiments relate generally to light attenuation and more particularly to light attenuation solutions for high power ultraviolet inspection toolset.

BACKGROUND INFORMATION

Wafer defect inspection systems use ultraviolet (UV) light to illuminate the wafer during the inspection process. Ultraviolet illumination of the wafer being inspected is beneficial because ultraviolet light provides a shorter wavelength than conventionally used white light. A shorter wavelength in combination with a more intense illumination provides a smaller inspection pixel size and higher detection sensitivity. Reliable and precise control of the high power ultraviolet light is therefore required to conduct high quality wafer inspection.

There currently are two major technologies used for controlling high power ultraviolet light, namely reflective or absorptive filtering and single radial gradient slit filtering.

In the first method, light attenuation of ultraviolet light is achieved by reflective or absorptive optical filter elements. Radially reflective or absorptive gradient coatings are common for such optical filters. The light attenuation is achieved by gradually blocking (reflecting or absorption) the incident light. This method of optical filter attenuation has the merit of uniform output, but typically has a fairly low damage threshold. With increased power and the damaging ultraviolet wavelength light source, the relatively low power damage threshold of these optical filter types become a major limitation. Said another way, these types of optical filters are quickly damaged by high power ultraviolet light and therefore are not a reliable solution for high power ultraviolet designs.

In the second method, the light attenuation is achieved by a single gradient slit filter. The power output from this single gradient slit filter is governed by the size of the opening of the slit. However, the light profile is not uniform across the clear aperture. The single gradient slit filter is also unable to provide high light attenuation with high resolution. This makes a single gradient slit filter undesirable for high power ultraviolet designs.

SUMMARY

In a first novel aspect, a light attenuating device includes a housing, a first filter, a first motor configured to move the first filter, and a pneumatic actuator configured to move the first filter to either be in contact with the housing or to not be in contact with the housing.

In one example, the filter includes multiple slit openings that vary in width such that the amount of light that passes through the multiple slit openings varies as the first filter is moved.

In another example, the filter includes multiple circular openings that vary in diameter such that the amount of light that passes through the multiple circular openings varies as the filter is moved.

In yet another example, the filter includes multiple slit openings and circular openings such that the amount of light that passes through the multiple slit openings and the multiple circular openings varies as the filter is moved.

In a second novel aspect, a light attenuating device includes a housing, a first filter, a first motor configured to move the first filter, a second filter, a second motor configured to move the second filter, and a pneumatic actuator configured to move the first filter to either be in contact with the housing or to not be in contact with the housing.

In a first example, the first filter and the second filter are coaxial.

In a second example, the first filter and the second filter are not coaxial.

In a third example, the first filter's pattern is orthogonal to the second filter's pattern.

In a fourth example, the first filter and the second filter rotate synchronously.

In a fifth example, the first filter and the second filter rotate asynchronously.

In a third novel aspect, a method of light attenuation includes adjusting the position of a filter such that a portion of the filter is irradiated by a radiating beam, and while maintaining the irradiation of the portion of the filter, moving the filter to be in contact with a thermally conductive object.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Figure 1:
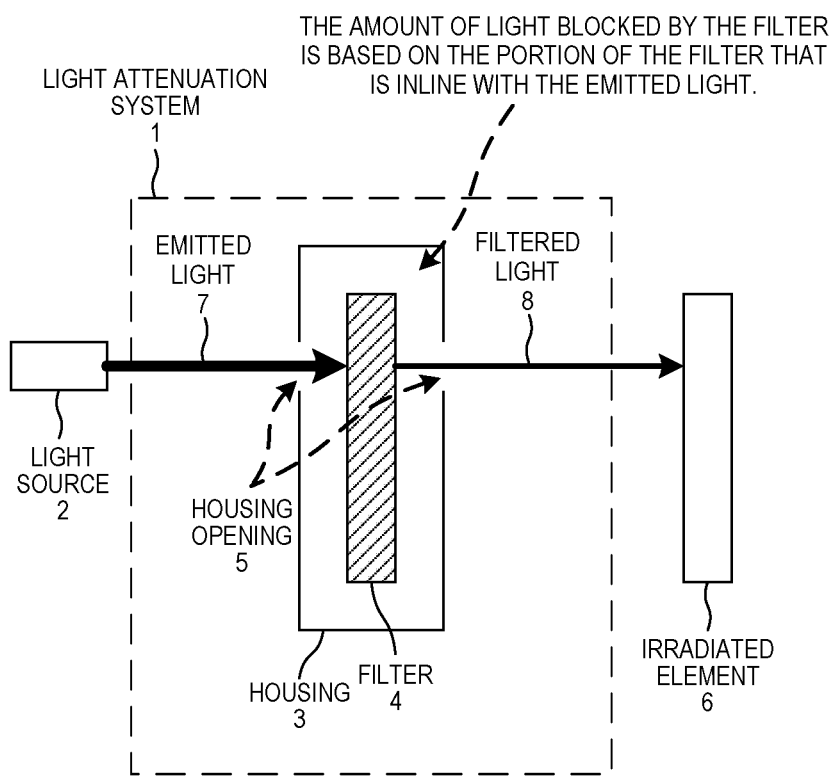
FIG. 1 is a diagram of a light attenuation system 1 including a single filter.

FIG. 1 is a diagram of a light attenuation system 1 including a single filter. Light attenuation system 1 includes a housing 3 that houses a filter 4. In operation, a light source 2 emits a high power ultraviolet light (emitted light 7) that travels through an opening in the housing (housing opening 5) and irradiates a portion of filter 4. A portion of emitted light 7 that is not filtered by filter 4 passes through filter 4 (filtered light 8) and is directed toward an element to be irradiated (irradiated element 6). In one example, irradiated element 6 is a wafer. The portion of the filter that is irradiated by the emitted light 7 is controlled by adjusting the position of the filter with respect to the emitted light 7. In the event that the light attenuation provided by filter varies across filter positions, then desired light attenuation can be achieved by positioning filter 4 such that the emitted light 7 irradiates the filter at a position where the filter provides the desired attenuation.

In one example the filter is circular in shape and is rotated about its center by a motor (not shown). The motor is controlled by an electronic control circuit (not shown). In this fashion, the light attenuation system 1 can control the rotation of the filter and thereby control the portion of the filter that is irradiated by the emitted beam from the light source 2.

Figure 2:
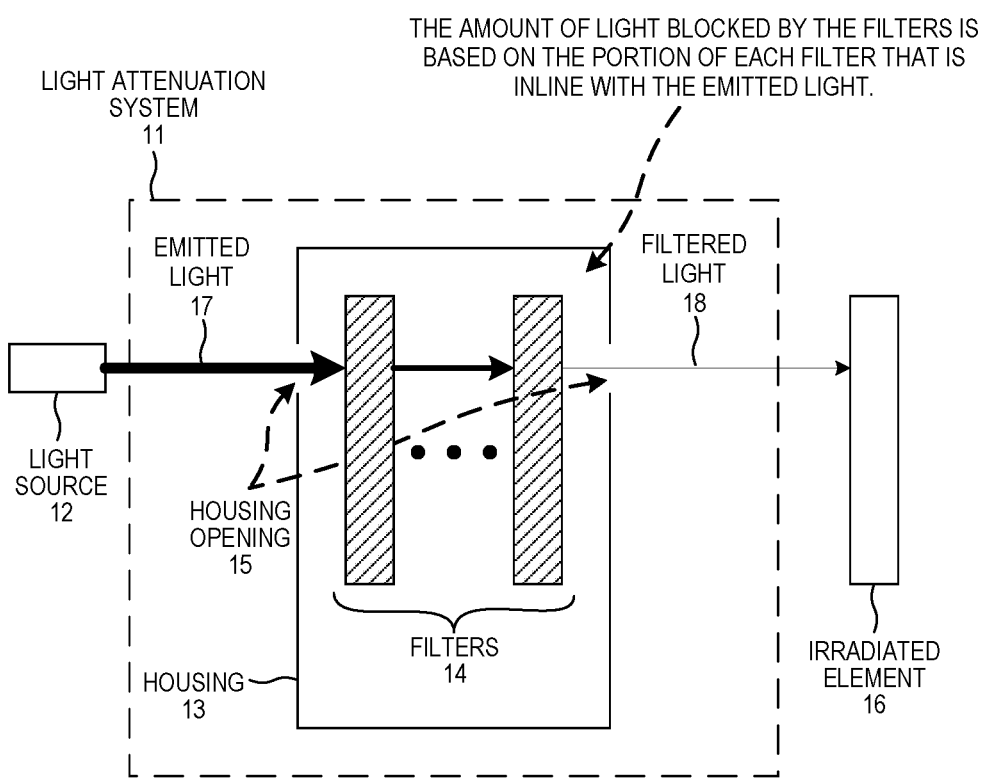
FIG. 2 is a diagram of a light attenuation system 11 including multiple coaxial filters.

FIG. 2 is a diagram of a light attenuation system 11 including multiple coaxial filters. Light attenuation system 11 includes a housing 13 that houses multiple filters 14. The multiple filters 14 are positioned coaxially. In operation, a light source 12 emits a high power ultraviolet light (emitted light 17) that travels through an opening in the housing (housing opening 15) and irradiates a portion of multiple filters 14. A portion of emitted light 17 that is not filtered by multiple filters 14 passes through multiple filters 14 (filtered light 18) and is directed toward an element to be irradiated (irradiated element 16). In one example, irradiated element 16 is a wafer. The portions of each of the multiple filters 14 that are irradiated by the emitted light 17 is controlled by adjusting the position of each of the multiple filters 14 with respect to the emitted light 17. In the event that the light attenuation provided by filter varies across filter positions, then desired light attenuation can be achieved by positioning the multiple filters 14 such that the emitted light 17 irradiates the multiple filters 14 each at a position where the multiple filters provides the desired attenuation. The use of multiple filters allows for both an increase in attenuation range as well as an increase in attenuation resolution.

In one example the filters are circular in shape and are rotated about their centers by one or more motors (not shown). The motor(s) are controlled by an electronic control circuit (not shown). In this fashion, the light attenuation system 1 can control the rotation of the filters and thereby control the portions of the filters that are irradiated by the emitted beam from the light source 2.

In another example, the patterns of the filters are configured to be orthogonal, such that each filter can attenuate in two directions respectively. This provides an attenuation range that can be doubled compared with a single filter design.

In yet another example, the filters can rotate synchronously or asynchronously. This enables different attenuation performance curves as well as different thermal management strategies. For example, in this fashion the first filter can be moved to a position where the first filter absorbs most of the thermal energy from the emitted light while the second filter is only used for fine tuning of the attenuation and therefore does not absorb very much thermal energy.

Figure 3:
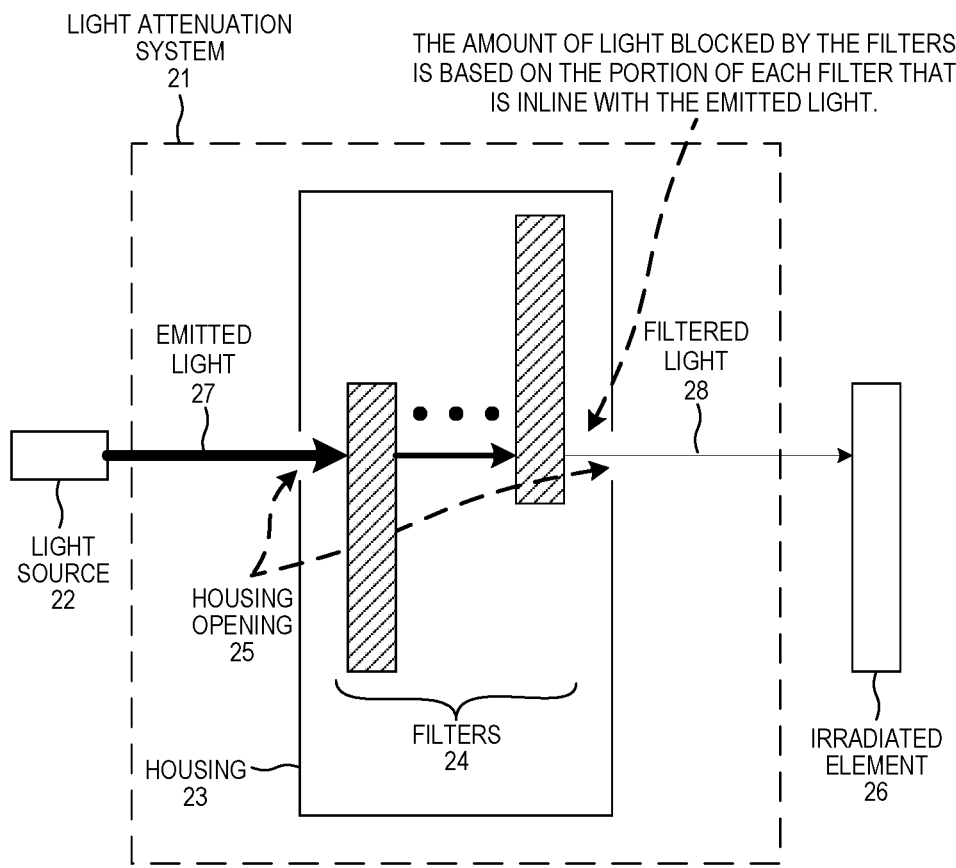
FIG. 3 is a diagram of a light attenuation system 21 including multiple non-coaxial filter.

FIG. 3 is a diagram of a light attenuation system 21 including multiple non-coaxial filters. Light attenuation system 21 includes a housing 23 that houses multiple filter 24. The multiple filters 24 are positioned non-coaxially. In operation, a light source 22 emits a high power ultraviolet light (emitted light 27) that travels through an opening in the housing (housing opening 25) and irradiates a portion of multiple filters 24. A portion of emitted light 27 that is not filtered by multiple filters 24 passes through multiple filters 24 (filtered light 28) and is directed toward an element to be irradiated (irradiated element 26). In one example, irradiated element 26 is a wafer. The portions of each of the multiple filters 24 that are irradiated by the emitted light 27 is controlled by adjusting the position of each of the multiple filters 24 with respect to the emitted light 27. In the event that the light attenuation provided by filter varies across filter positions, then desired light attenuation can be achieved by positioning the multiple filters 24 such that the emitted light 27 irradiates the multiple filters 24 each at a position where the multiple filters provides the desired attenuation. The use of multiple filters allows for both an increase in attenuation range as well as an increase in attenuation resolution.

In one example the filters are circular in shape and are rotated about their centers by one or more motors (not shown). The motor(s) are controlled by an electronic control circuit (not shown). In this fashion, the light attenuation system 1 can control the rotation of the filters and thereby control the portions of the filters that are irradiated by the emitted beam from the light source 2.

In another example, the patterns of the filters are configured to be orthogonal, such that each filter can attenuate in two directions respectively. This provides an attenuation range that can be doubled compared with a single filter design.

In yet another example, the filters can rotate synchronously or asynchronously. This enables different attenuation performance curves as well as different thermal management strategies. For example, in this fashion the first filter can be moved to a position where the first filter absorbs most of the thermal energy from the emitted light while the second filter is only used for fine tuning of the attenuation and therefore does not absorb very much thermal energy.

Figure 4:
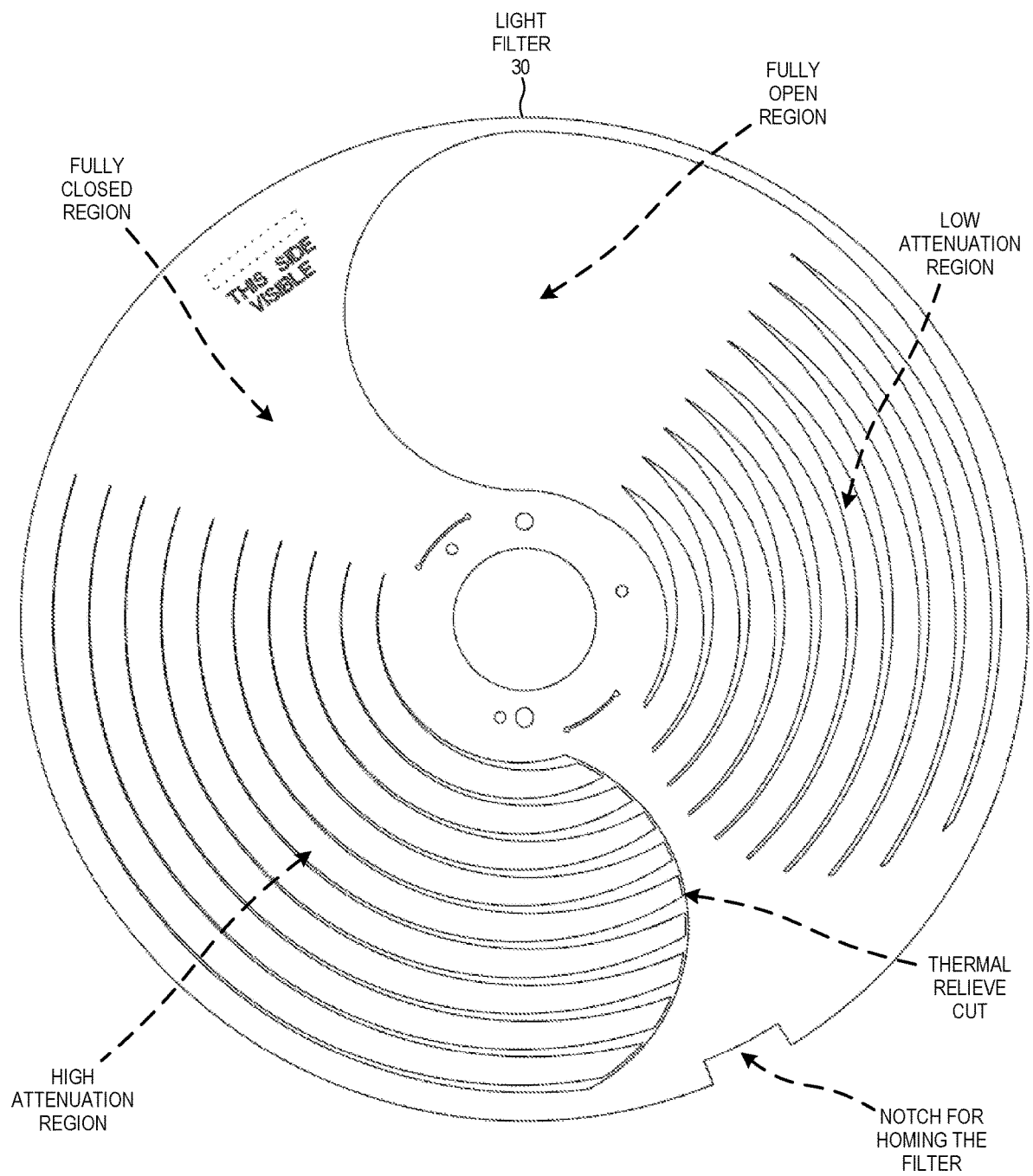
FIG. 4 is a two-dimensional diagram of a filter with multiple radial variant slits.

FIG. 4 is a two-dimensional diagram of a filter 30 with multiple radial variant slits. The filter is designed to be rotated about its center. Starting at the top left hand side of the filter, the filter includes a fully closes region. This is a region of the filter with no openings, thereby not allowing any light to pass through this region of the filter. The area of this region is greater than the beam area of the emitted light. Moving clockwise to the top center of the filter, the filter includes a fully open region. This is a region of the filter with a contiguous large opening, thereby not blocking any of the light in this region. The area of this region is greater than the beam area of the emitted light. Moving further clockwise along the filter, the filter includes a low attenuation region. This low attenuation region includes multiple radial variant slits. The slit openings transition from large openings to fully closed. In one example, the width of each slit opening is identical if at the same angular location and governed by the following function to deliver linear attenuation output.

$$w = b^{\theta + a}$$

Where w is the width of the slit opening, θ is the angular location, and "a" and "b" are constants that determine boundary conditions of the slit openings.

Moving further clockwise along the filter, the filter includes a thermal relieve cut. The thermal relieve cut prevents the buckling of the filter structure due to thermal expansion that occurs when variant slits width filter operates in the high attenuation region that causes the filter's thermal energy to increase.

Moving further clockwise along the filter, the filter includes a high attenuation region. This high attenuation region includes multiple radial variant slits. The slit openings transition from large openings to fully closed. This multiple radial variant slit openings, however, are smaller than the multiple radial variant slit openings included in the low attenuation region, thereby providing a higher degree of attenuation.

The filter with multiple radial variant slits also includes a notch for homing the filter. Homing the filter is the process in which the filter orientation is aligned with the filter position control system (i.e. drive rod, drive motor . . . ).

Figure 5:
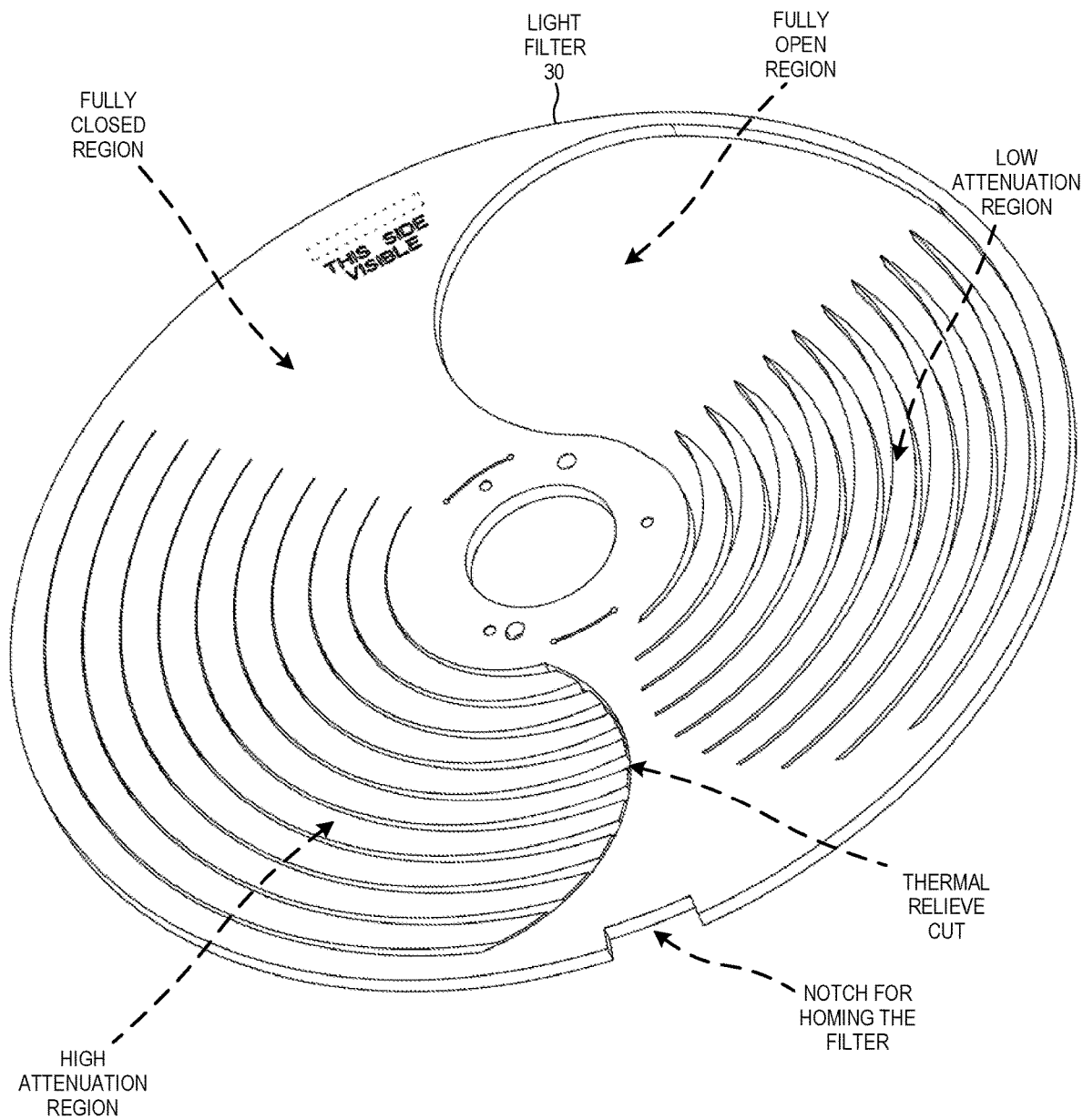
FIG. 5 is a three-dimensional diagram of a filter with multiple radial variant slits.

FIG. 5 is a three-dimensional diagram of a filter 30 with multiple radial variant slits. This 3-D view provides a perspective view of the filter with radial variant slits.

Figure 6:
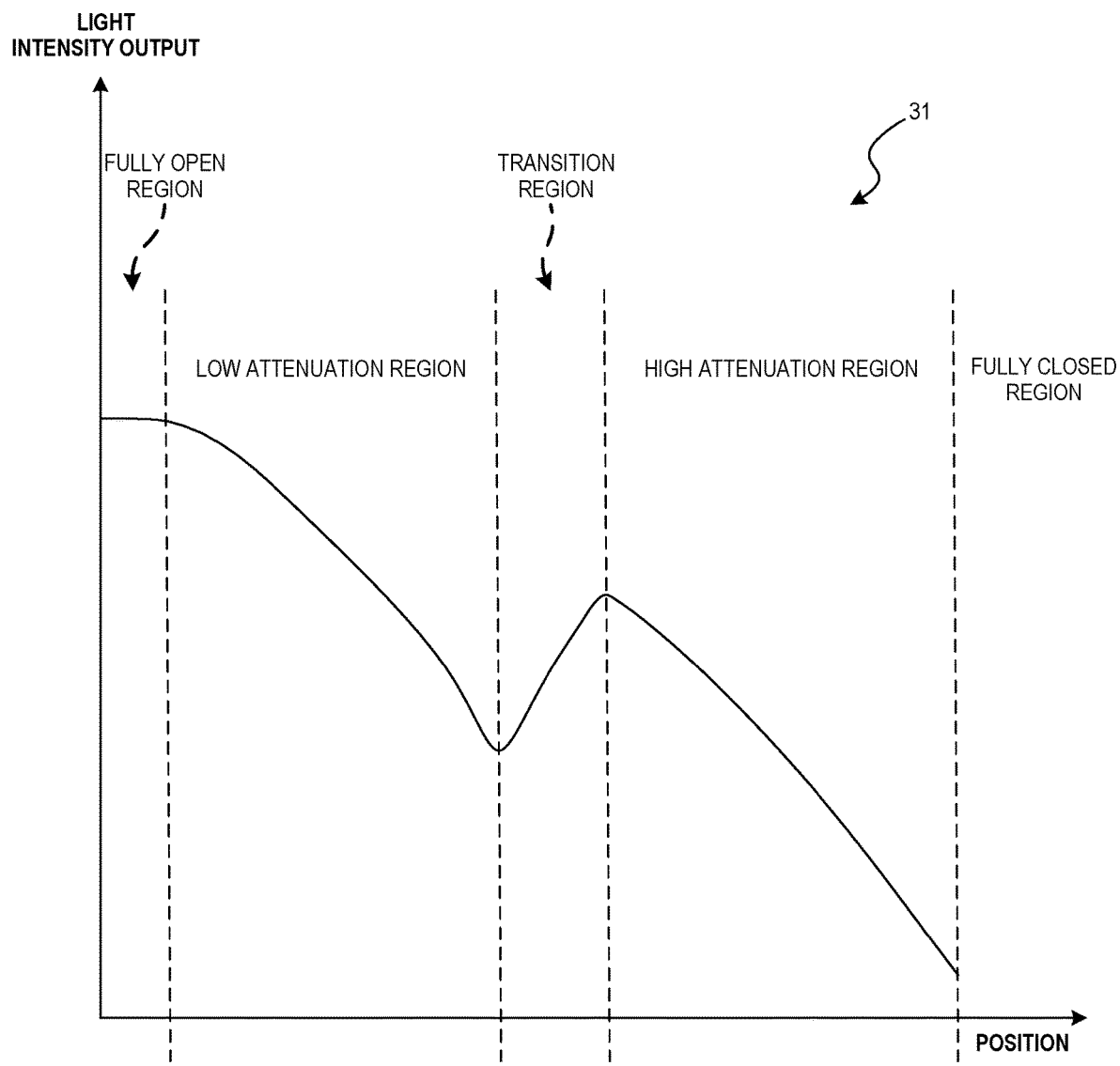
FIG. 6 is a graph illustrating the relationship of light intensity output and position for a filter with multiple radial variant slits.

FIG. 6 is a graph 31 illustrating the relationship of light intensity output and position for a filter with multiple radial variant slits. As discussed above, in the fully open region all light passes through the filter and no attenuation is provided. In the low attenuation region, the light is modestly attenuated more and more as you move clockwise along the filter with multiple radial variant slits. Then there is the transition region between the low attenuation region and the high attenuation region. In the high attenuation region, the light is aggressively attenuated more and more as you move clockwise along the filter with multiple radial variant slits. Then, as discussed above, there is the fully closed region where no light passes through the filter.

Figure 7:
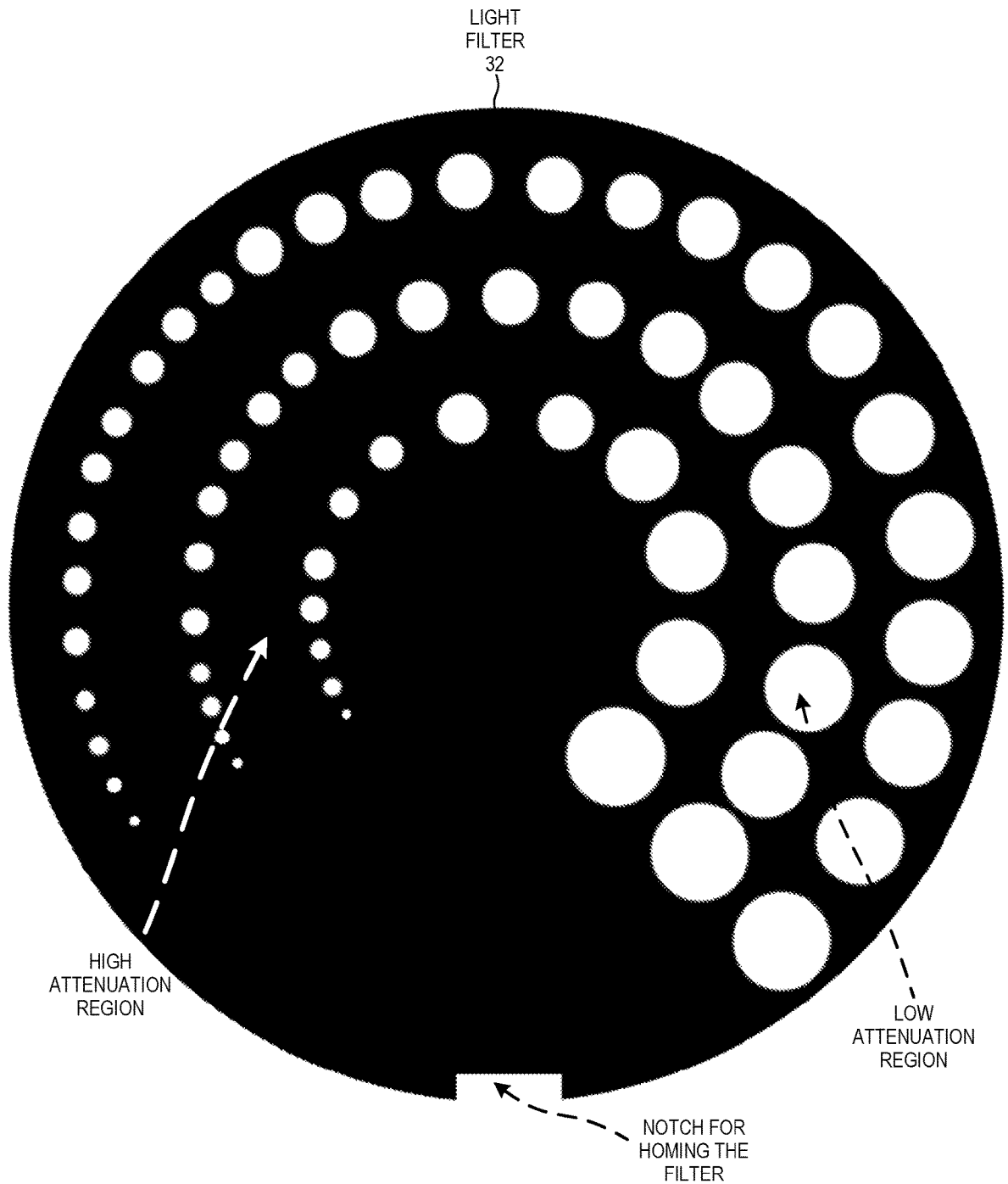
FIG. 7 is a two-dimensional diagram of a filter with multiple variant radius holes.

FIG. 7 is a two-dimensional diagram of a filter 32 with multiple variant radius holes. The filter is designed to be rotated about its center. As shown in FIG. 7, the filter includes multiple circular holes that increase with size in the clockwise direction. The filter also includes a notch for homing the filter. In operation, the filter can be rotated such that the amount of light that passes through the filter is either increased or decreased. The filter also includes a fully closed region where no light passes through the filter.

Figure 8:
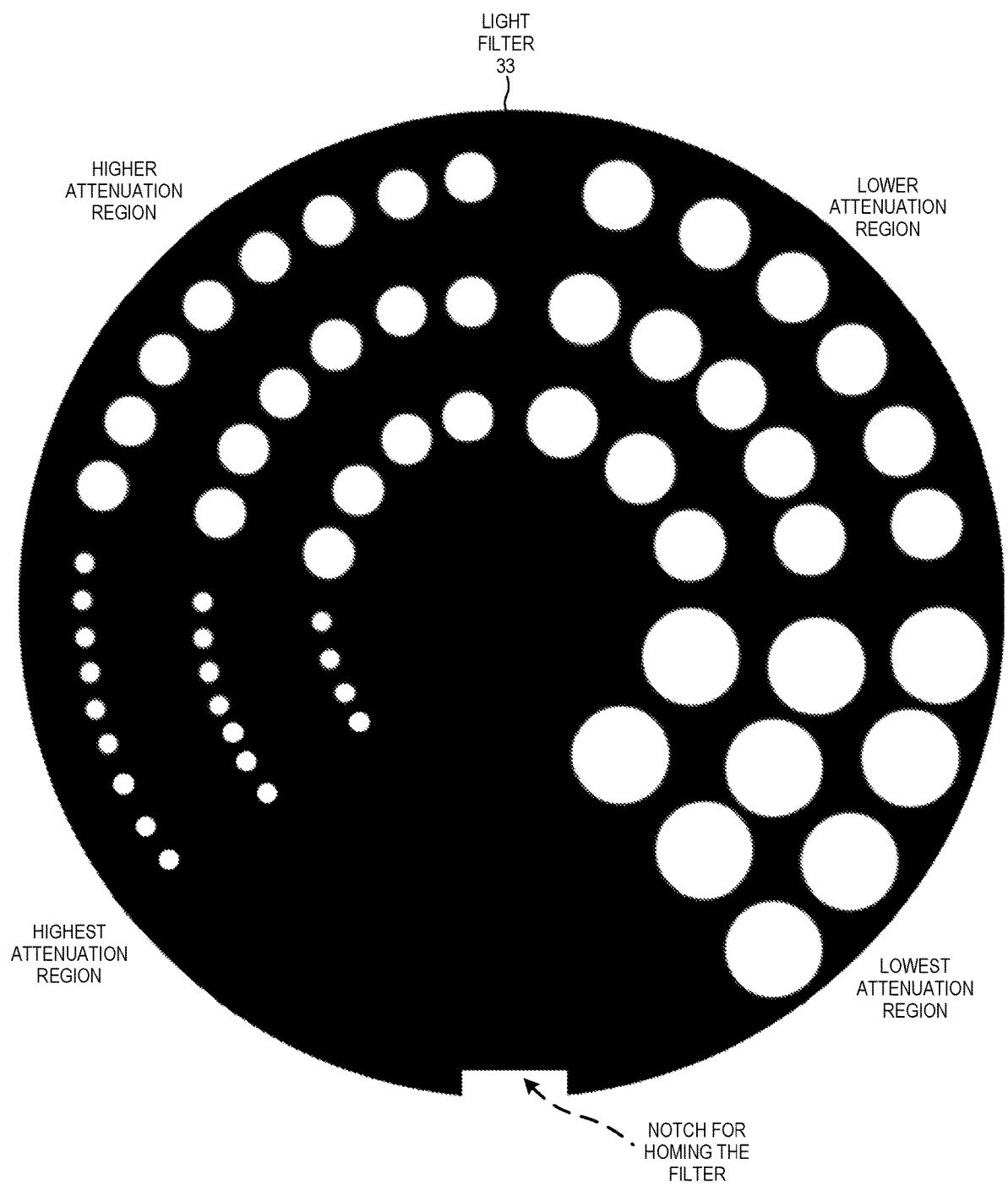
FIG. 8 is a two-dimensional diagram of a filter with multiple discrete hole size regions.

FIG. 8 is a two-dimensional diagram of a filter 33 with multiple discrete hole size regions. The filter is designed to be rotated about its center. As show in FIG. 8, the filter includes multiple circular holes that increase discretely in size in the clockwise direction. For example, in the highest attenuation region all the openings are the same size. In the higher attenuation region, all the openings are the same size as all the other openings in the higher attenuation region. The openings in the higher attenuation region are larger than the openings in the highest attenuation region. In the lower attenuation region, all the openings are the same size as all the other openings in the lower attenuation region. The openings in the lower attenuation region are larger than the openings in the higher attenuation region. In the lowest attenuation region, all the openings are the same size as all the other openings in the lowest attenuation region. The openings in the lowest attenuation region are larger than the openings in the low attenuation region. In this fashion, the filter provides four different levels of attenuation.

It is noted herein that a filter may also be used that is a combination of one or more of the filters illustrated in FIGS. 4-5, 7 and 8. For example, a filter that is a combination of radial variant slit openings and variant radius holes may be used to achieve the desired attenuation response.

Figure 9:
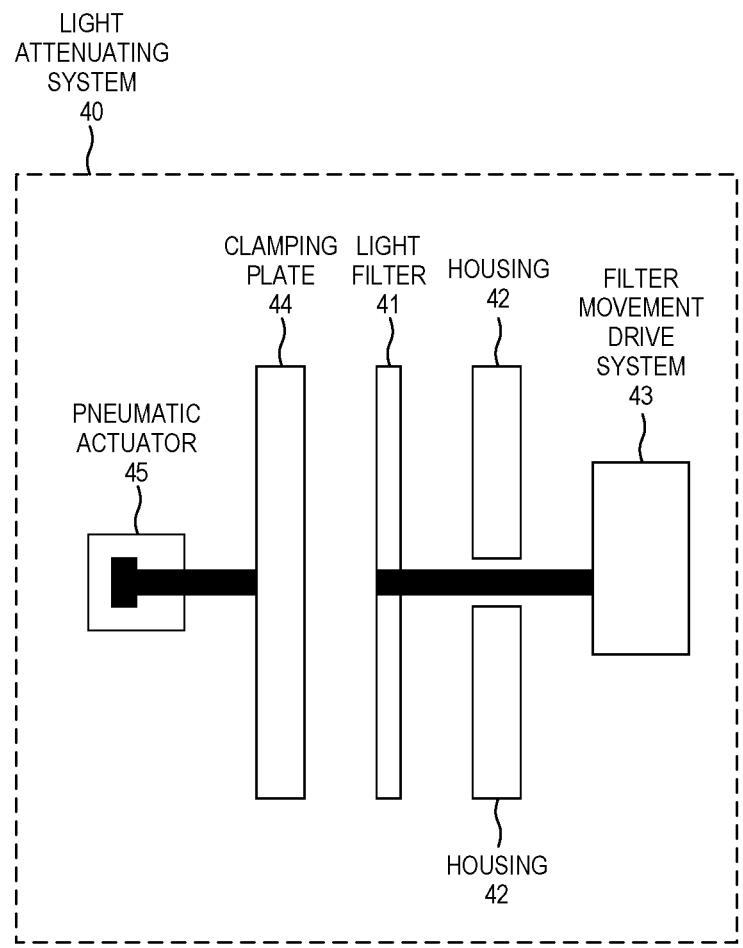
FIG. 9 is a diagram of a light attenuating system 40 with filter in the unclamped position.

FIG. 9 is a diagram of a light attenuating system 40 with filter cooling in the unclamped position. FIG. 9 is a two-dimensional cutout view of the light attenuating system 40. The light attenuating system 40 includes a light filter 41, a housing 42, a filter movement drive system 43, a clamping plate 44, and a pneumatic actuator 45. Filter movement drive system 43 may include a motor to cause the filter to be moved. Filter movement drive system 43 may also include a rotary ball spline to allow for rotational and axial motion of the filter. Filter movement drive system 43 may also include driving and driven gears to cause the filter to be moved.

As mentioned above, FIG. 9 illustrates the light attenuating system 40 in the unclamped state. In this unclamped state, there is air between the clamping plate 44 and the light filter 41, as well as between light filter 41 and housing 42. Due to the low thermal conductivity of air, the amount of thermal energy that can be transferred from the light filter 41 to the housing 42 is greatly limited.

Figure 10:
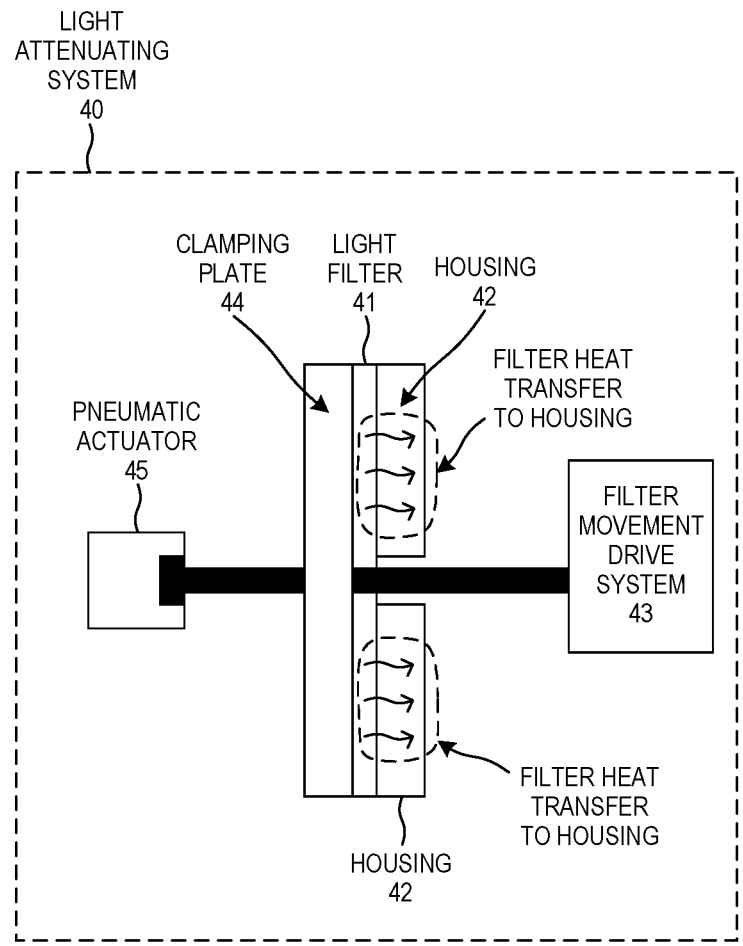
FIG. 10 is a diagram of a light attenuating system 40 with filter cooling in the clamped position.

FIG. 10 is a diagram of a light attenuating system 40 with filter cooling in the clamped position. As mentioned above, FIG. 10 illustrates the light attenuating system 40 the clamped state. In this clamped state, there is little to no air between the light filter 41 and the housing 42. This greatly improves the amount of thermal energy that can be transferred from the light filter 41 to the housing 42. The amount of thermal energy that can be transferred can be further improved by making the light filter 41 from a material with high thermal conductivity, such as a copper-alloy. Similarly, the amount of thermal energy that can be transferred can also be further improved by making the housing from a material with high thermal conductivity, such as copper-alloy.

Given that the thermal energy is being transferred from the light filter 41 to the housing 42, the housing 42 needs a method for being cooled. In a first example, the housing 42 is cooled by simply radiating the thermal energy to the air surrounding the housing 42. In a second example, the housing 42 is cooled by passing a cooling fluid though channels within the housing 42. In this example, the cooling fluid may be cold water that absorbs the thermal energy from the housing 42 as it passes through the housing 42. In this fashion, the housing 42 can absorb all the thermal energy from the filter 41 while maintaining a relatively low thermal energy. Using this cooling schema the light filter 41 can withstand significant high power in the magnitude of one-hundred times the power that can be withstood by previous methods.

FIGS. 9 and 10 illustrate a light attenuating system with only a single filter, however, multiple filters can easily be added to provide a higher resolution light attenuation system. Higher attenuation range on the order of five-thousand to one (or 3.74 optical density) can be achieved using this technology.

It is noted herein, that in a multiple filter system one or more of the filters may benefit from being in contact with the housing for improved cooling. It is also noted herein, that although a pneumatic actuator is described as providing the means of moving the filter to come into contact with the housing, one skilled in the art will readily realize that many other devices may be used to cause the filter to be moved into contact with the housing.

Figure 11:
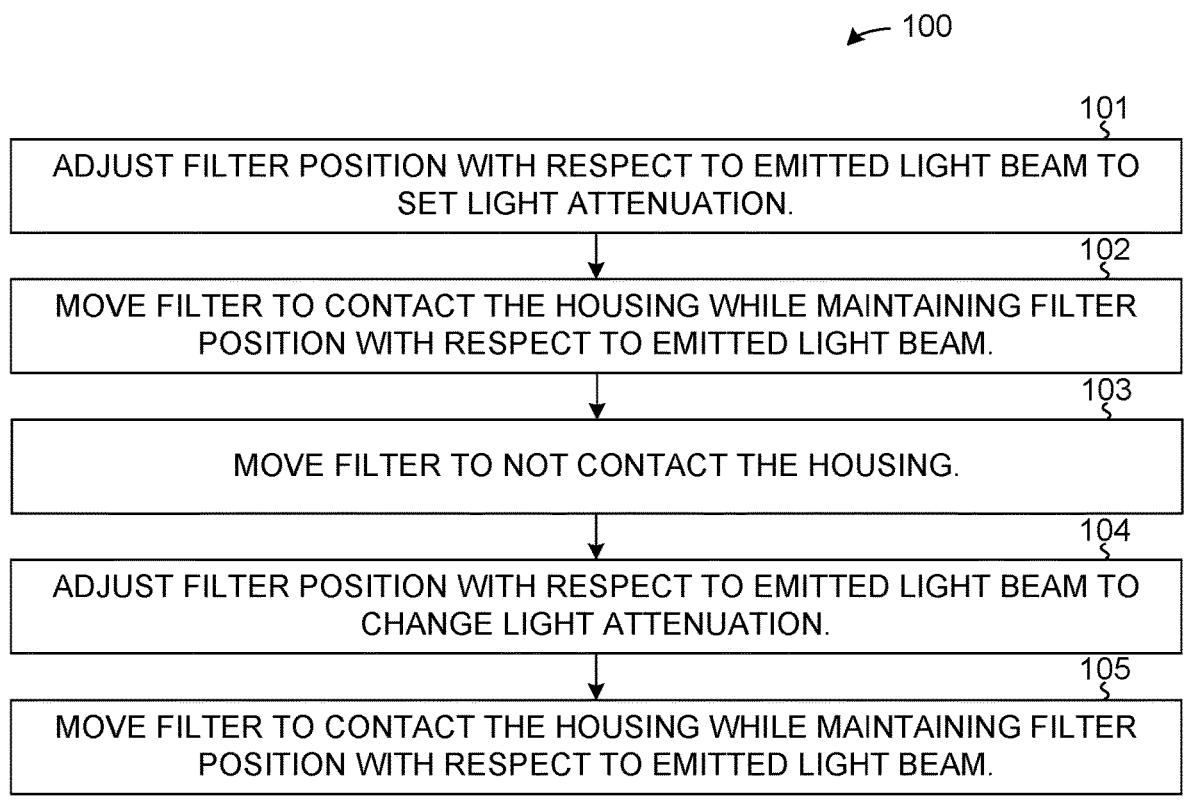
FIG. 11 is a flowchart 100 describing the operation of a light attenuation system including a single filter.

FIG. 11 is a flowchart 100 describing the operation of a light attenuation system including a single filter. In step 101, the filter position is adjusted with respect to the emitted light beam to set the light attenuation. In step 102, the filter is moved to be in contact with the housing while maintaining the filter position with respect to the emitted light beam. In step 103, the filter is moved so that it is not in contact with the housing. In step 104, the filter position is adjusted with respect to the emitted light beam to change the light attenuation. In step 105, the filter is moved to be in contact to with the housing while maintaining the filter position with respect to the emitted light beam.

Figure 12:
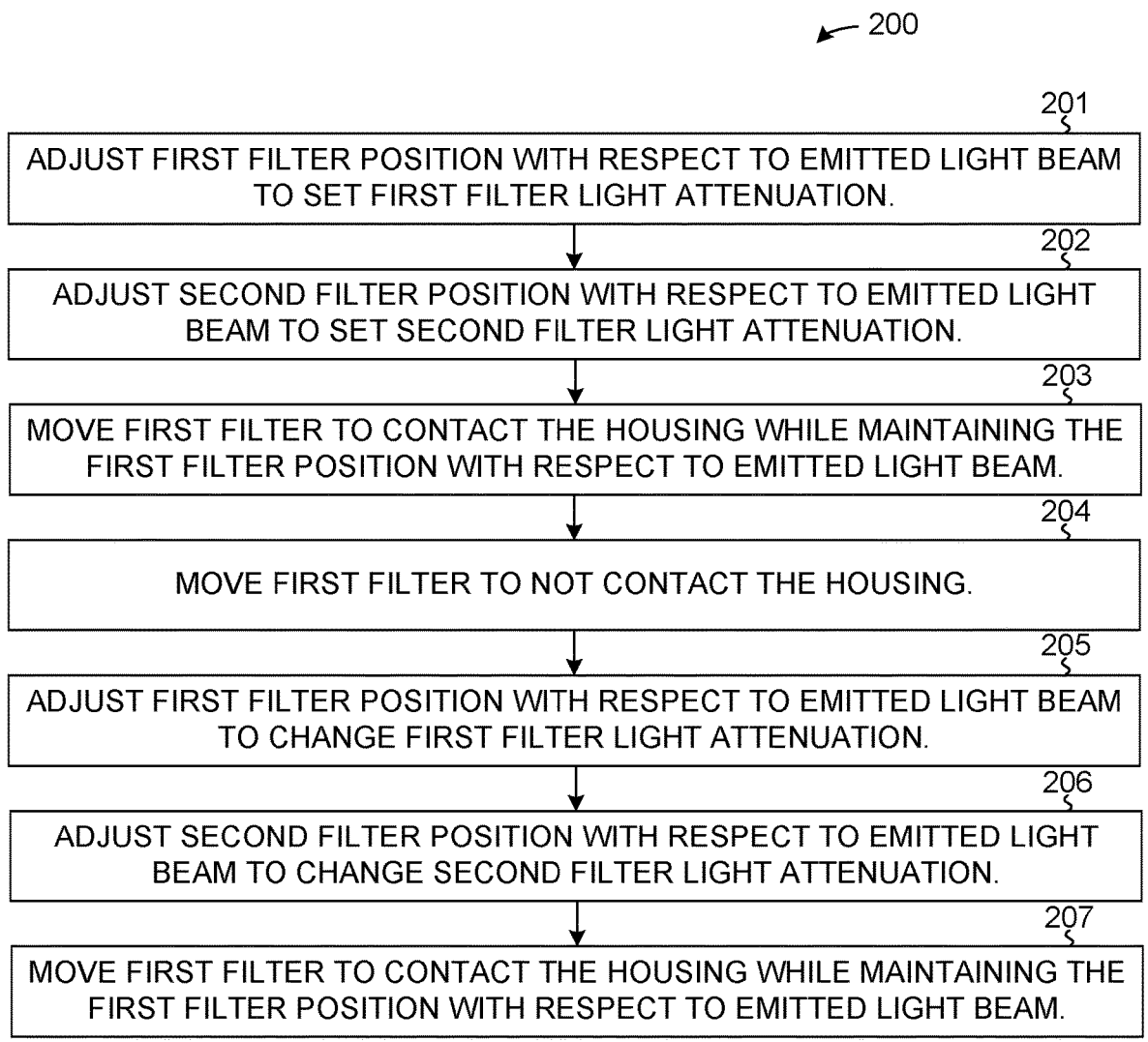
FIG. 12 is a flowchart 200 describing the operation of a light attenuation system including two filters.

FIG. 12 is a flowchart 200 describing the operation of a light attenuation system including two filters. In step 201, the first filter position is adjusted with respect to the emitted light beam to set the first filter light attenuation. In step 202, the second filter position is adjusted with respect to the emitted light beam to set the second filter light attenuation. In step 203, the first filter is moved to be in contact with the housing while maintaining the first filter position with respect to the emitted light beam. In step 204, the first filter is moved to not be in contact with the housing. In step 205, the first filter position is adjusted with respect to the emitted light beam to change the first filter light attenuation. In step 206, the second filter position is adjusted with respect to the emitted light beam to change the second filter light attenuation. In step 207, the first filter is moved to be in contact with the housing while maintaining the first filter position with respect to the emitted light beam.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A light attenuating device, comprising:
a housing having an opening;
a first filter housed in the housing, wherein a portion of the first filter as housed in the housing is to be irradiated by a light beam through the opening in the housing;
a first motor configured to rotate the first filter to adjust a position of the first filter with respect to the light beam, wherein the position of the first filter with respect to the light beam controls the portion of the first filter to be irradiated; and
a pneumatic actuator configured to move the first filter to either be in contact with the housing or to not be in contact with the housing while maintaining the position of the first filter with respect to the light beam.

2. The light attenuating device of claim 1, further comprising:
a second filter housed in the housing, wherein a portion of the second filter as housed in the housing is to be irradiated by the light beam; and
a second motor configured to rotate the second filter.

3. The light attenuating device of claim 2, wherein the first filter and the second filter are coaxial.

4. The light attenuating device of claim 2, wherein the first filter and the second filter are not coaxial.

5. The light attenuating device of claim 2, wherein:
the first filter incudes multiple openings in a first opening pattern;
the second filter includes multiple openings in a second opening pattern; and
the first opening pattern of the first filter is orthogonal to the second opening pattern of the second filter.

6. The light attenuating device of claim 2, wherein the first motor and the second motor are operable to rotate the first filter and the second filter synchronously.

7. The light attenuating device of claim 2, wherein the first motor and the second motor are operable to rotate the first filter and the second filter asynchronously.

8. The light attenuating device of claim 1, wherein the first filter includes multiple slit openings that vary in width such that the amount of light that passes through the multiple slit openings varies as the first filter is rotated.

9. The light attenuating device of claim 1, wherein the first filter includes multiple circular openings that vary in diameter such that the amount of light that passes through the multiple circular openings varies as the first filter is rotated.

10. The light attenuating device of claim 1, wherein the first motor is configured to rotate the first filter about a center.

11. The light attenuating device of claim 1, wherein:
the first filter is thermally conductive; and
the housing is thermally conductive.

12. The light attenuating device of claim 1, wherein the first filter is composed of a copper alloy.

13. The light attenuating device of claim 1, wherein the housing comprises a cooling system.

14. The light attenuating device of claim 13, wherein the cooling system comprises:
fluid channels within the housing, and
a coolant fluid to flow through the fluid channels within the housing.

15. The light attenuating device of claim 14, wherein the coolant fluid is water.

16. The light attenuating device of claim 1, wherein the first filter includes an alignment notch.

17. The light attenuating device of claim 1, wherein the first filter includes an opening that is at least as large as a beam area of the light beam.

18. The light attenuating device of claim 1, wherein the first filter includes an area without any opening that is at least as large as a beam area of the light beam.

19. The light attenuating device of claim 1, wherein the amount of light that passes through the first filter is to be controlled by movement of the filter with respect to the light beam.

20. The light attenuating device of claim 1, further comprising an electronic control circuit to control the first motor and the pneumatic actuator.

21. The light attenuating device of claim 1, wherein the first filter includes multiple openings such that the amount of light that passes through the multiple openings varies as the first filter is moved, the multiple openings including at least one of multiple slit openings or multiple circular openings.

22. A method of light attenuation, comprising:
adjusting the position of a filter such that a portion of the filter is irradiated by a radiating beam, wherein the filter is housed in a thermally conductive housing and the portion of the filter is irradiated through an opening in the thermally conductive housing;
while maintaining the irradiation of the portion of the filter as housed in the thermally conductive housing, moving the filter to be in contact with the thermally conductive housing; and with the filter moved to be in contact with the thermally conductive housing, maintaining the irradiation of the portion of the filter as housed in the thermally conductive housing.

23. The method of claim 22, wherein the filter includes multiple openings such that the amount of light that passes through the multiple openings varies as the filter is moved, the multiple openings including at least one of multiple slit openings or multiple circular openings.

\* \* \* \* \*